(12) United States Patent
Tayu et al.

(10) Patent No.: US 6,984,271 B2
(45) Date of Patent: *Jan. 10, 2006

(54) RARE EARTH MAGNET, PROCESS FOR PRODUCING SAME, AND MOTOR USING RARE EARTH MAGNET

(75) Inventors: Tetsurou Tayu, Kanagawa (JP); Hideaki Ono, deceased, late of Yokohama (JP); by Takae Ono, legal representative, Yokohama (JP); Makoto Kano, Yokohama (JP); Munekatsu Shimada, Tokyo (JP); Yoshio Kawashita, Kanagawa (JP); Takeshi Yamauchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,422

(22) Filed: Mar. 26, 2004

(65) Prior Publication Data

US 2004/0187963 A1 Sep. 30, 2004

(30) Foreign Application Priority Data

Mar. 28, 2003 (JP) ............................ 2003-090340
Sep. 25, 2003 (JP) ............................ 2003-332933

(51) Int. Cl.
*H01F 1/053* (2006.01)
*H01F 1/057* (2006.01)

(52) U.S. Cl. ...................... 148/301; 148/302; 148/101; 148/102; 148/103; 75/232; 75/233; 75/234; 75/244; 75/246; 419/12; 419/20

(58) Field of Classification Search .............. 148/101, 148/102, 103, 301, 302; 75/232, 233, 234, 75/244, 246; 419/12, 20
See application file for complete search history.

(56) References Cited

U.S. PATENT DOCUMENTS

| 4,762,574 A | * | 8/1988 | Ghandehari .................. 148/103 |
| 4,891,078 A | * | 1/1990 | Ghandehari .................. 148/301 |
| 2002/0112785 A1 | * | 8/2002 | Sekine et al. ............... 148/302 |
| 2004/0000359 A1 | * | 1/2004 | Tayu et al. .................. 148/302 |

FOREIGN PATENT DOCUMENTS

| JP | 10-321427 A | 12/1998 |
| JP | 2000-82610 A | 3/2000 |
| JP | 2002-64010 A | 2/2002 |

OTHER PUBLICATIONS

Machine translation of Japanese Patent Publication 2000-082610, Mar. 21, 2000.*
Machine translation of Japanese Patent Publication No. 2002-064010, Feb. 2, 2002.*

* cited by examiner

Primary Examiner—John P Sheehan
(74) Attorney, Agent, or Firm—Foley & Lardner LLP

(57) ABSTRACT

A rare earth magnet to be used in a motor. The rare earth magnet comprises rare earth magnet particles. Additionally, a rare earth oxide is present among the rare earth magnet particles, the rare earth oxide being represented by the following general formula (I):

$$R_{2x}R'_{2(1-x)}O_3 \qquad (I)$$

where each of R and R' is one element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and 0<x<1.

17 Claims, 2 Drawing Sheets

RARE EARTH MAGNET, PROCESS FOR PRODUCING SAME, AND MOTOR USING RARE EARTH MAGNET

BACKGROUND OF THE INVENTION

The present invention relates to a rare earth magnet having a high electric resistance.

Inexpensive ferrite magnets have been extensively used as magnets used in a permanent magnet motor, and associated with miniaturization and advance of performance of an electric rotating machine, rare earth magnets having higher capability are increasing the using amount thereof. Representative examples of the rare earth magnets include a Sm—Co magnet and a Nd—Fe—B based magnet, and the performance and the cost thereof are being further improved.

However, rare earth magnets have a low electric resistance since it is a metallic magnet. Therefore, a motor having a rare earth magnet installed therein suffers such a problem in that the eddy current loss is increased to lower the efficiency of the motor. In view of such circumstances, various techniques have been proposed for increasing the electric resistance of the rare earth magnet itself to solve the problem.

For example, rare earth magnets having such a structure has been proposed that contain rare earth magnet particles bound with $SiO_2$ and/or $Al_2O_3$ particles, as disclosed in Japanese Patent Provisional Publication No. 10-321427. The electric resistance of the rare earth magnet can be increased with $SiO_2$ or $Al_2O_3$ intervening among the rare earth magnet. However, the magnet characteristics, such as the coercive force and the residual magnetization, are significantly lowered by adding $SiO_2$ or $Al_2O_3$. It is accordingly difficult to be applied to motors of moderate to high power output.

According to the conventional techniques described in the foregoing, improvement of the electric resistance of the rare earth magnet can be attained, but it brings about significant deterioration in magnet characteristics.

SUMMARY OF THE INVENTION

It is an object of the present invention to provide an improved rare earth magnet which can effectively overcome drawbacks encountered in conventional rare earth magnets.

Another object of the present invention is to provide an improved rare earth magnet which is high in electric resistance while suppressing degradation of magnet characteristics to the maximum level.

A further object of the present invention is to provide an improved rare earth magnet in which a rare earth oxide is present among rare earth magnet particles so as to exhibit excellent magnet characteristics even if severe production conditions are applied because the rare earth oxide is low in reactivity with rare earth elements.

An aspect of the present invention resides in a rare earth magnet comprising rare earth magnet particles. Additionally, a rare earth oxide is present among the rare earth magnet particles, the rare earth oxide being represented by the following general formula (I):

$$R_{2x}R'_{2(1-x)}O_3 \qquad (I)$$

where each of R and R' is one element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$.

Another aspect of the present invention resides in a process for producing a rare earth magnet. The process comprises (a) preparing a mixture containing rare earth magnet powder and rare earth oxide powder whose rare earth oxide is represented by the following general formula (I):

$$R_{2x}R'_{2(1-x)}O_3 \qquad (I)$$

where each of R and R' is an element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$; (b) charging a forming die with the mixture; and (c) forming the mixture.

A further aspect of the present invention resides in a motor comprising a rare earth magnet. The rare earth magnet includes rare earth magnet particles. Additionally, a rare earth oxide is present among the rare earth magnet particles, the rare earth oxide being represented by the following general formula (I):

$$R_{2x}R'_{2(1-x)}O_3 \qquad (I)$$

where each of R and R' is one element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$.

DETAILED DESCRIPTION OF THE INVENTION

The invention relates to, as a first aspect, a rare earth magnet containing rare earth magnet particles and a rare earth oxide represented by the following general formula (I) intervening among the rare earth magnet particles:

$$R_{2x}R'_{2(1-x)}O_3 \qquad (I)$$

where R and R' each represents yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) or lutetium (Lu), and $0<x<1$.

The rare earth magnet of the invention will be described with reference to the drawings.

Figure 1:
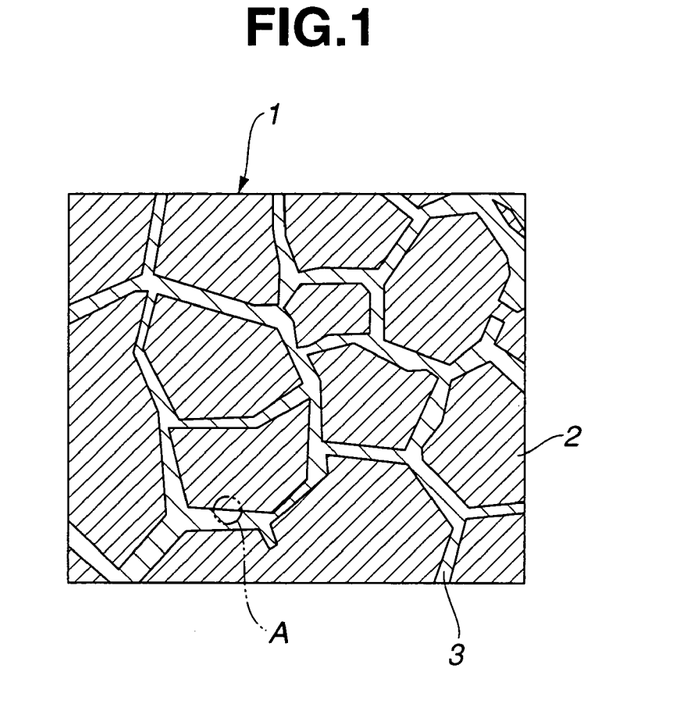
FIG. 1 is a schematic illustration of a rare earth magnet according to the present invention.
Figure 2:
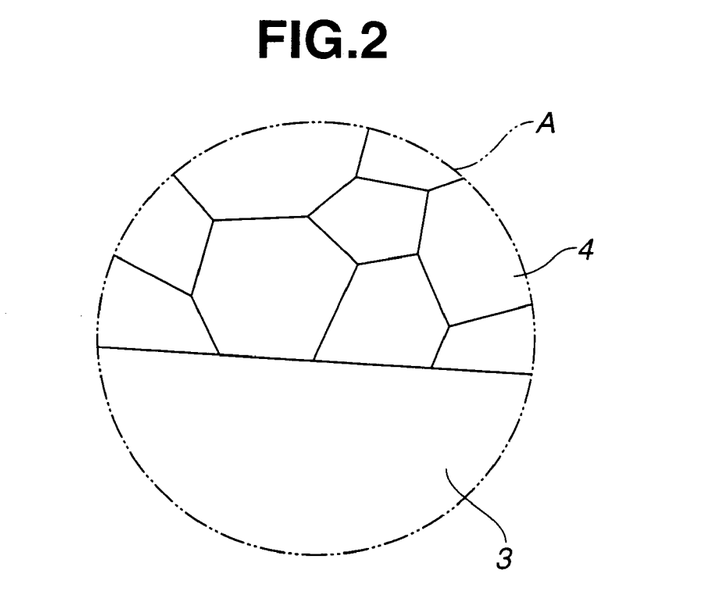
FIG. 2 is an enlarged view of a part surrounded by a broken circle A in FIG. 1.

FIG. 1 is a schematic cross sectional view showing an embodiment of the rare earth magnet of the invention. The rare earth magnet 1 of the invention contains rare earth magnet particles 2 exhibiting magnetic characteristics and a rare earth oxide 3 having insulating property. The rare earth oxide 3 intervenes or presents among the rare earth magnet particles 2 to form such a structure that the rare earth magnet particles 2 are bound with the rare earth oxide 3. FIG. 2 is an enlarged view of an area surrounded by a broken circle A in FIG. 1. In the case where anisotropic rare earth magnet powder prepared by s so-called HDDR (Hydrogenation—Disproportionation—Desorption—Recombination) method or the hot plastic forming method is used as a raw material of the rare earth magnet particles 2, the rare earth magnet particles 2 are formed from aggregates of numerous fine crystal grains 4 as shown in FIG. 2. The sizes of the particles in this case are generally from 1 to 500 $\mu$m for the rare earth magnet particles 2 and 500 nm or less for the crystal grains 4 constituting the rare earth magnet particles 2.

In the case where the rare earth oxide 3 intervenes among the rare earth magnet particles 2 in the rare earth magnet 1, the rare earth oxide 3 functions as an insulating material to increase the electric resistance of the rare earth magnet 1 significantly. It is preferred that the rare earth magnet particles 2 are completely covered with the rare earth oxide 3, but there may be such a part that is not covered with the rare earth oxide 3 as far as the effect of increasing the electric resistance is exhibited. The rare earth oxide 3 may have such a shape like a continuous wall that surrounds the rare earth magnet particles 2 as shown in the figures, and may have such a shape that particles are connected to each other to isolate the rare earth magnet particles 2. The figures referred herein are simplified for facilitating understanding, and the technical scope of the invention is not limited to the magnets having the embodiment shown in the figures.

In order to obtain a rare earth magnet having a high maximum energy product, it is necessary that the volume fraction of the magnet component occupied in the rare earth magnet is sufficiently increased. However, a rare earth magnet is generally difficult to attain sufficient plastic deformation by cold forming under a practical applied pressure of 980 MPa or less due to the high hardness thereof, and as a result, a magnet thus obtained has a low maximum energy product due to a large amount of pores contained.

It is thus effective to conduct pressure forming or pressure sintering, in which magnet powder softened under heat is subjected to pressure molding. By using the pressure sintering, it is possible that rare earth magnet powder as a raw material can be sufficiently subjected to plastic deformation to obtain a rare earth magnet having a high density. The temperature required in the pressure sintering is about 500° C. or higher, for example, in the case using Nd—Fe—B based rare earth magnet powder. Therefore, an insulating material present in the rare earth magnet is demanded to maintain the sufficient insulating characteristics even in the case where it is exposed to a high temperature as in the pressure sintering.

A rare earth magnet is generally liable to suffer from chemical change, such as surface oxidation, to cause a problem of deterioration in magnet characteristics, such as coercive force and residual magnetization. It is expected that this is because active rare earth elements contained in the magnet reduce the insulating material at the production step such as pressure sintering. Therefore, the insulating material present in the rare earth magnet is demanded not to react with the magnet component.

The inventors have made earnest investigations to obtain an insulating material satisfying the characteristics (i.e., the heat resistance and the non-reactivity with the magnet component of the insulating material). It is considered that these characteristics receive influence of plural factors. It is considered that one of the factors is the magnitude relationship in thermodynamic stability. The inventors have noted that it is possible to explore an insulating material having small reactivity with a magnet component containing a rare earth element having rich chemical reactivity by selecting such an insulating material that is expected to have small reactivity with a rare earth element.

As a result of earnest investigations made by the inventors under consideration of such factors that are considered to influence on the magnet characteristics, it has been found that a rare earth composite or double oxide and a rare earth oxide solid solution represented by $R_{2x}R'_{2(1-x)}O_3$ (which is sometimes simply referred to as a rare earth oxide) are excellent as the insulating material. The symbols R and R' herein each represents yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) or lutetium (Lu), and $0<x<1$. The rare earth oxide is significantly suitable for preventing the magnet characteristics of the rare earth magnet from being deteriorated and for improving the electric resistance of the rare earth magnet. It is possible that two or more kinds of rare earth oxides having different R, R' or x are used in combination, and a rare earth oxide represented by the general formula $R_2O_3$ may be used in combination.

The effect of the rare earth magnet of the invention will be summarized as follows. Firstly, a rare earth oxide is present among rare earth magnet particles, whereby a rare earth magnet thus obtained has a very high electric resistance. Secondary, the rare earth oxide defined in the invention has small reactivity with a rare earth element, whereby a rare earth magnet thus obtained has considerably excellent magnet characteristics even in the case where severe production conditions, such as pressure sintering, are employed. Thirdly, the rare earth oxide contained in the rare earth magnet has high heat resistance, whereby sufficient insulating property is maintained even after exposing to high temperature conditions, such as pressure sintering.

The rare earth magnet of the invention will be described in detail below.

[Rare Earth Oxide]

The composition of the rare earth oxide is a sesquioxide of rare earth containing two elements selected from yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), as described in the foregoing. Specific examples thereof include $Y_{2x}La_{2(1-x)}O_3$, $Y_{2x}Ce_{2(1-x)}O_3$, $Y_{2x}Pr_{2(1-x)}O_3$, $Y_{2x}Nd_{2(1-x)}O_3$, $Y_{2x}Sm_{2(1-x)}O_3$, $Y_{2x}Eu_{2(1-x)}O_3$, $Y_{2x}Gd_{2(1-x)}O_3$, $Y_{2x}Tb_{2(1-x)}O_3$, $Y_{2x}Dy_{2(1-x)}O_3$, $Y_{2x}Ho_{2(1-x)}O_3$, $Y_{2x}Er_{2(1-x)}O_3$, $Y_{2x}Tm_{2(1-x)}O_3$, $Y_{2x}Yb_{2(1-x)}O_3$, $Y_{2x}Lu_{2(1-x)}O_3$, $La_{2x}Ce_{2(1-x)}O_3$, $La_{2x}Pr_{2(1-x)}O_3$, $La_{2x}Nd_{2(1-x)}O_3$, $La_{2x}Sm_{2(1-x)}O_3$, $La_{2x}Eu_{2(1-x)}O_3$, $La_{2x}Gd_{2(1-x)}O_3$, $La_{2x}Tb_{2(1-x)}O_3$, $La_{2x}Dy_{2(1-x)}O_3$, $La_{2x}Ho_{2(1-x)}O_3$, $La_{2x}Er_{2(1-x)}O_3$, $La_{2x}Tm_{2(1-x)}O_3$, $La_{2x}Yb_{2(1-x)}O_3$, $La_{2x}Lu_{2(1-x)}O_3$, $Ce_{2x}Pr_{2(1-x)}O_3$, $Ce_{2x}Nd_{2(1-x)}O_3$, $Ce_{2x}Sm_{2(1-x)}O_3$, $Ce_{2x}Eu_{2(1-x)}O_3$, $Ce_{2x}Gd_{2(1-x)}O_3$, $Ce_{2x}Tb_{2(1-x)}O_3$, $Ce_{2x}Dy_{2(1-x)}O_3$, $Ce_{2x}Ho_{2(1-x)}O_3$, $Ce_{2x}Er_{2(1-x)}O_3$, $Ce_{2x}Tm_{2(1-x)}O_3$, $Ce_{2x}Yb_{2(1-x)}O_3$, $Ce_{2x}Lu_{2(1-x)}O_3$, $Pr_{2x}Nd_{2(1-x)}O_3$, $Pr_{2x}Sm_{2(1-x)}O_3$, $Pr_{2x}Eu_{2(1-x)}O_3$, $Pr_{2x}Gd_{2(1-x)}O_3$, $Pr_{2x}Tb_{2(1-x)}O_3$, $Pr_{2x}Dy_{2(1-x)}O_3$, $Pr_{2x}Ho_{2(1-x)}O_3$, $Pr_{2x}Er_{2(1-x)}O_3$, $Pr_{2x}Tm_{2(1-x)}O_3$, $Pr_{2x}Yb_{2(1-x)}O_3$, $Pr_{2x}Lu_{2(1-x)}O_3$, $Nd_{2x}Sm_{2(1-x)}O_3$, $Nd_{2x}Eu_{2(1-x)}O_3$, $Nd_{2x}Gd_{2(1-x)}O_3$, $Nd_{2x}Tb_{2(1-x)}O_3$, $Nd_{2x}Dy_{2(1-x)}O_3$, $Nd_{2x}Ho_{2(1-x)}O_3$, $Nd_{2x}Er_{2(1-x)}O_3$, $Nd_{2x}Tm_{2(1-x)}O_3$, $Nd_{2x}Yb_{2(1-x)}O_3$, $Nd_{2x}Lu_{2(1-x)}O_3$, $Sm_{2x}Eu_{2(1-x)}O_3$, $Sm_{2x}Gd_{2(1-x)}O_3$, $Sm_{2x}Tb_{2(1-x)}O_3$, $Sm_{2x}Dy_{2(1-x)}O_3$, $Sm_{2x}Ho_{2(1-x)}O_3$, $Sm_{2x}Er_{2(1-x)}O_3$, $Sm_{2x}Tm_{2(1-x)}O_3$, $Sm_{2x}Yb_{2(1-x)}O_3$, $Sm_{2x}Lu_{2(1-x)}O_3$, $Eu_{2x}Gd_{2(1-x)}O_3$, $Eu_{2x}Tb_{2(1-x)}O_3$, $Eu_{2x}Dy_{2(1-x)}O_3$, $Eu_{2x}Ho_{2(1-x)}O_3$, $Eu_{2x}Er_{2(1-x)}O_3$, $Eu_{2x}Tm_{2(1-x)}O_3$, $Eu_{2x}Yb_{2(1-x)}O_3$, $Eu_{2x}Lu_{2(1-x)}O_3$, $Gd_{2x}Tb_{2(1-x)}O_3$, $Gd_{2x}Dy_{2(1-x)}O_3$, $Gd_{2x}Ho_{2(1-x)}O_3$, $Gd_{2x}Er_{2(1-x)}O_3$, $Gd_{2x}Tm_{2(1-x)}O_3$, $Gd_{2x}Yb_{2(1-x)}O_3$, $Gd_{2x}Lu_{2(1-x)}O_3$, $Tb_{2x}Dy_{2(1-x)}O_3$, $Tb_{2x}Ho_{2(1-x)}O_3$, $Tb_{2x}Er_{2(1-x)}O_3$, $Tb_{2x}Tm_{2(1-x)}O_3$, $Tb_{2x}Yb_{2(1-x)}O_3$, $Tb_{2x}Lu_{2(1-x)}O_3$, $Dy_{2x}Ho_{2(1-x)}O_3$, $Dy_{2x}Er_{2(1-x)}O_3$, $Dy_{2x}Tm_{2(1-x)}O_3$, $Dy_{2x}Yb_{2(1-x)}O_3$, $Dy_{2x}Lu_{2(1-x)}O_3$, $Ho_{2x}Er_{2(1-x)}Ho_{2x}Tm_{2(1-x)}O_3$, $Ho_{2x}Yb_{2(1-x)}O_3$, $Ho_{2x}Lu_{2(1-x)}O_3$, $Er_{2x}Tm_{2(1-x)}O_3$, $Er_{2x}Yb_{2(1-x)}O_3$, $Er_{2x}Lu_{2(1-x)}O_3$, $Tm_{2x}Yb_{2(1-x)}O_3$, $Tm_{2x}Lu_{2(1-x)}O_3$ and $Yb_{2x}Lu_{2(1-x)}O_3$. These may be used in combination of two or more kinds of them.

The content of the rare earth oxide can be appropriately determined taking account of the desired electric resistance and magnet characteristics. In the case where the magnet characteristics are in preference, the content of the rare earth oxide may be suppressed. In the case where the electric resistance is in preference, the content of the rare earth oxide may be increased. However, in the case where the content of the rare earth oxide is too small, there is such a possibility that the electric resistance of the rare earth magnet thus formed is not sufficiently high. Therefore, the rare earth oxide is preferably contained in an amount of 0.1% by mass (or by weight) or more, and more preferably 1% by mass or more, based on the total mass (or weight) of the magnet. In the case where the content of the rare earth oxide is too large, on the other hand, the magnet characteristics of the rare earth magnet thus formed are largely lowered. Therefore, the rare earth oxide is preferably contained in an amount of 20% by mass or less, and more preferably 5% by mass or less, based on the total mass of the magnet.

[Rare Earth Magnet Particles]

The rare earth magnet particles contain a ferromagnetic main phase and other components. In the case where the rare earth magnet is a Nd—Fe—B based magnet, the main phase is a $Nd_2Fe_{14}B$ phase. In view of improvement of the magnet characteristics, it is preferred that the rare earth magnet particles are anisotropic rare earth magnet particles prepared by the HDDR method or the hot plastic forming method. The anisotropic rare earth magnet particles prepared by the HDDR method or the hot plastic forming method are in the form of aggregates of numerous fine crystal grains 4 as shown in FIG. 2. In this case, it is preferred that the crystal grains 4 have an average particle size equal to or less than the single domain particle size from the standpoint of improvement of the coercive force. Examples of the rare earth magnet particles also include a Sm—Co based magnet, as well as a Nd—Fe—B based magnet. A Nd—Fe—B based magnet is preferred in view of the magnet characteristics and the production cost of the rare earth magnet thus obtained. However, the rare earth magnet of the invention is not limited to a Nd—Fe—B based magnet. Two or more kinds of rare earth magnets may be present as a mixture in the rare earth magnet in some cases. In other words, two or more kinds of Nd—Fe—B based magnets having different compositional ratios may be present as a mixture, and a Nd—Fe—B magnet and a Sm—Co magnet may be present as a mixture.

The term "Nd—Fe—B based magnet" referred herein means such a concept that encompasses those modes in which parts of Nd and Fe are substituted with other elements. A part or the whole of Nd may be substituted with Pr, and a part of Nd may be substituted with another rare earth element, such as Tb, Dy and Ho. The substitutions may be effected to one of the elements or to both the elements. The substitutions can be attained by adjusting the compounding amounts of an elemental alloy. The substitutions can improve the coercive force of the Nd—Fe—B based magnet. The amount of Nd to be substituted is preferably from 0.01 to 50% by atom (or atomic percent) based on the amount of Nd. In the case where it is less than 0.01% by atom, there is such a possibility that the effect of the substitution is insufficient. In the case where it exceeds 50% by atom, there is such a possibility that the remanent flux density cannot be maintained on a high level.

Fe may be substituted with another transition metal, such as Co. The substitution increases the Curie temperature (Tc) of the Nd—Fe—B based magnet to enhance the usable temperature range thereof. The amount of Fe to be substituted is preferably from 0.01 to 30% by atom based on the amount of Fe. In the case where it is less than 0.01% by atom, there is such a possibility that the effect of the substitution is insufficient. In the case where it exceeds 30% by atom, there is such a possibility that decrease of the coercive force is increased.

The rare earth magnet particles in the rare earth magnet preferably have a particle size of from 1 to 500 $\mu$m. In the case where the particle size of the rare earth magnet particles is less than 1 $\mu$m, influence of oxidation deterioration becomes large due to the large specific surface area of the magnet to cause such a possibility that the magnet characteristics of the rare earth magnet are deteriorated. In the case where the particle size of the rare earth magnet particles exceeds 500 $\mu$m, the magnet particles are broken by pressure during production, and a sufficient electric resistance is difficult to be obtained. Moreover, in the case where an anisotropic magnet is produced by using anisotropic rare earth magnet powder as a raw material, it is difficult to align the orientation direction of the main phase (the $Nd_2Fe_{14}B$ phase in an Nd—Fe—B based magnet) in the rare earth magnet powder all over the size exceeding 500 $\mu$m. The particle size of the rare earth magnet particles is controlled by adjusting the particle size of the rare earth magnet powder particles as a raw material of the magnet. The particle size of the rare earth magnet particles can be measured by using a so-called SEM (Scanning Electron Microscopy) image. The particle size discussed hereinafter is also measured by using the same SEM image.

[Kinds of Rare Earth Magnet]

The invention can be applied to all an isotropic magnet produced from isotropic magnet powder, an isotropic magnet produced by providing random orientation to anisotropic magnet powder, and an anisotropic magnet produced by aligning the orientation of anisotropic magnet powder in a certain direction. In the case where a magnet having a high maximum energy product is to be produced, it is preferred that anisotropic magnet powder is used as a raw material and orientation is provided in a magnetic field to produce an anisotropic magnet.

A process for producing a rare earth magnet as a second aspect of the invention will be described.

The invention relates to, as the second aspect, a process for producing a rare earth magnet containing steps of: (1)

preparing a mixture containing rare earth magnet powder and rare earth oxide powder represented by the following general formula (I):

$$R_{2x}R'_{2(1-x)}O_3 \quad (I)$$

where R and R' each represents yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) or lutetium (Lu), and 0<x<1; (2) charging the mixture in a forming die; and (3) forming the mixture.

The process steps will be described in sequence. Upon carrying out the production process of the invention, other steps may be added for improving the productivity and the characteristics of a magnet to be obtained. Furthermore, any known improvement may be applied thereto. Those production processes containing additional steps and improvements are encompassed in the technical scope of the invention as far as the process steps defined in the invention are contained.

[Preparation of Mixture]

Rare earth magnet powder and a prescribed rare earth oxide powder are prepared.

The rare earth magnet powder is produced by mixing raw materials corresponding to the composition of the rare earth magnet to be produced. In the case where a Nd—Fe—B based magnet containing a $Nd_2Fe_{14}B$ phase as a main phase is produced, Nd, Fe and B are mixed in a certain ratio. The rare earth magnet powder may be that produced by the known method or may be a commercially available product. It is preferred to use anisotropic rare earth magnet powder produced by the HDDR method or a so-called UPSET method utilizing hot plastic forming. The anisotropic rare earth magnet powder of this kind forms aggregates of numerous fine crystal grains. It is preferred that the crystal grains constituting anisotropic rare earth magnet powder have an average grain size equal to or less than the single domain particle size from the standpoint of improvement of the coercive force. Specifically, the average grain size of the crystal grains is preferably 500 nm or less. The HDDR method is such a technique in that an $Nd_2Fe_{14}B$ compound as a main phase is decomposed into three phases, $NdH_3$, α-Fe and $Fe_2B$ by hydrogenating an Nd—Fe—B alloy, and then $Nd_2Fe_{14}B$ is again formed by a forced dehydrogenation treatment. The UPSET method is such a technique in that a Nd—Fe—B alloy produced by the rapid quenching method is pulverized and provisionally formed, and then it is subjected to hot plastic forming.

The particle size of the rare earth magnet powder is preferably from 1 to 500 μm. In the case where the particle size of the rare earth magnet powder is less than 1 μm, influence of oxidation deterioration becomes large due to the large specific surface area of the rare earth magnet powder to cause such a possibility that the magnet characteristics of the rare earth magnet are deteriorated. In the case where the particle size of the rare earth magnet exceeds 500 μm, the magnet particles are broken by pressure upon production to cause such a possibility that the electric resistance of the rare earth magnet thus obtained is lowered. Moreover, in the case where an anisotropic magnet is produced by using anisotropic rare earth magnet powder as a raw material, it is difficult to align the orientation direction of the main phase (the $Nd_2Fe_{14}B$ phase in an Nd—Fe—B based magnet) over the rare earth magnet powder having a size exceeding 500 μm.

The particle size of the rare earth magnet can be controlled by selecting a pulverizer and classifying rare earth magnet particles thus pulverized.

The rare earth oxide powder is finally contained as an insulating material in the rare earth magnet. The rare earth oxide powder can be produced in the following manner. Rare earth oxide powder selected from $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$ is mixed as the raw materials and subjected to a heat treatment at temperature of from 1,600 to 2,000° C. in the atmospheric air for 4 to 12 hours to obtain a rare earth oxide sintered product. The raw materials may be obtained by oxidizing rare earth elements having certain particle sizes. The rare earth oxide is appropriately selected corresponding to the elements to be contained in the magnet. The average oxidation number of the rare earth elements in the rare earth oxide sintered product thus obtained may exceed +3. In this case, the rare earth oxide sintered product is preferably subjected to hydrogen reduction by subjecting to a heat treatment in a hydrogen atmosphere at a temperature of from 900 to 1,100° C. for 4 to 12 hours to adjust the oxidation number. Examples of the method for adjusting x in the general formula (I) to satisfy the condition 0<x<1 include a method of adjusting x according to the addition amounts of the raw materials.

The resulting rare earth oxide powder is used as it is, or used after pulverizing in a pulverizer, such as a ball mill. In the case where the average particle size of the rare earth oxide powder is too large, contact of the magnet particles frequently occurs, and as a result, the resistivity of the bulk body is lowered. On the other hand, production of ultrafine particles is troublesome. Therefore, the average particle size of the rare earth oxide powder is preferably about from 0.1 to 3 μm. As having been described in the foregoing, plural kinds of rare earth elements may be combined to form a rare earth composite oxide powder, whereby deterioration of the magnet characteristics is suppressed to the minimum, and the electric resistivity of the magnet is further improved.

A mixture is obtained by using the rare earth magnet powder and the rare earth oxide powder thus prepared. The term "mixture" referred herein means not only a mixture containing the rare earth magnet powder and the rare earth oxide powder simply mixed with each other, but also a product containing the rare earth magnet powder and the rare earth oxide powder which are physically or chemically bound with each other. It is preferred from the standpoint of working efficiency that the rare earth magnet powder is covered with the rare earth oxide powder in the mixture, in view of the final state shown in FIG. 1, in which the rare earth magnet particles are surrounded by the rare earth oxide. The forming method of the mixture is not particularly limited, and various kinds of known techniques may be used depending on the desired state of the mixture. In order to cover the rare earth magnet powder with the rare earth oxide powder, such a technique may be used as CVD (Chemical Vapor Deposition) using a rare earth complex compound as a starting material. In some cases, such a method may also be employed that a solution containing the rare earth oxide powder is coated on the surface of the rare earth magnet powder. Other methods may also be used. The amount of the rare earth oxide in the mixture is preferably from 0.1 to 20% by mass, and more preferably from 1 to 5% by mass, based on the total amount of the rare earth magnet powder and the rare earth oxide powder. In the case where the particle size of the rare earth oxide powder used is controlled, a sieve may be used.

[Charging Forming Die with Mixture]

A forming die is charged with the mixture. The shape of the forming die is not particularly limited and can be determined corresponding to the part, to which the magnet is to be applied. Upon charging in the forming die, it is preferred that the mixture is provisionally formed by applying appropriate pressure. The pressure upon provisional forming is generally about from 98 to 490 MPa. In the case where the rare earth magnet powder used is an anisotropic magnet powder, an anisotropic rare earth magnet can be obtained by effecting the provisional forming while the rare earth magnet powder is subjected to magnetic field orientation. The magnetic field applied for orientation is generally about from 1.2 to 2.2 MA/m.

[Forming of Mixture]

The mixture charged in the forming die is formed to obtain a bulk magnet. It is understood that the operation of binding the mixture by the above provisional forming does not fall under the category of "forming" in the invention. The forming can be carried out by using a well-known apparatus that is generally used for producing a magnet. Preferably, it is preferred to form by the pressure sintering. In the case where the forming is carried out by pressure sintering, the rare earth magnet powder as a raw material can be sufficiently subjected to plastic deformation to obtain a rare earth magnet having a high density. The pressure sintering method is not particularly limited, and hot press or electro-discharge plasma sintering can be employed. In particular, the use of electro-discharge plasma sintering provides such an advantage that solidification can be effected in a short period of time. The pressure for forming is about from 49 to 980 MPa. The sintering conditions are generally from 600 to 850° C. and from 0 to 5 minutes. The sintering is generally carried out under vacuum of 10 Pa or less or under an inert gas flow.

In the case where anisotropic magnet powder is used as the raw material magnet powder, magnetic field orientation is preferably effected upon forming, as having been well known in the art. The forming is carried out with the easy magnetization axes of the raw material magnet powder being aligned, whereby the residual magnetization in the orientation direction can be large, and the energy product of the magnet can be improved. The orientation magnetic field applied is generally about from 1.2 to 2.2 MA/m.

The temperature, at which the mixture is formed, is not particularly limited, and it is preferably compressed at a temperature of the operation environment under consideration of easiness and cost of the operation. The operation environment is preferably cared in humidity or the like in order to prevent the mixture from being deteriorated by oxidation.

[Treatment after Forming]

The magnet thus formed is then subjected to various treatments, such as processing (e.g., grinding and polishing), surface treatments (e.g., formation of a protective film and coating), and magnetization.

Various known techniques can be applied to the processing of the rare earth magnet. Examples of the processing include grinding (such as grinding the outside surface and the inside surface, flat surface grinding and forming grinding), cutting (such as cutting the outside periphery and the inside periphery), lapping, and chamfering. Examples of the processing tool include a diamond tool, a GC grinding stone, an outside and inside periphery cutting machine, an outside and inside periphery grinding machine, an NC lathe, a milling machine and a machining center.

A protective film may be formed on the surface of the rare earth magnet since the magnet is liable to be oxidized. While constitution of the protective film is not particularly limited, an appropriate constitution can be selected depending on the magnet characteristics, and an appropriate thickness thereof can be determined to obtain sufficient protection effect.

Specific examples of the protective film include a metallic film, an inorganic compound film and an organic compound film. Examples of the metallic film include Ti, Ta, Mo and Ni, examples of the inorganic compound film include a transition metal nitride film, such as TiN and CrN, and a transition metal oxide film, such as NiO and FeO, and examples of the organic compound film include a resin film, such as an epoxy resin, a phenol resin, polyurethane and polyester. The thickness of the protective film is preferably about from 0.01 to 10 µm in the case where the protective film is formed of a metallic film or an inorganic compound film, and is preferably from 1 to 10 µm in the case where the protective film is formed of an organic compound.

The magnetization can be carried out with a static magnetic field or a pulse magnetic field. As an index for obtaining a magnetization state close to the saturation, the intensity of the magnetic field for magnetization is generally twice or more, and preferably 4 times or more, the spontaneous coercive force.

Subsequently, a motor as a third aspect of the invention will be described.

Figure 3:
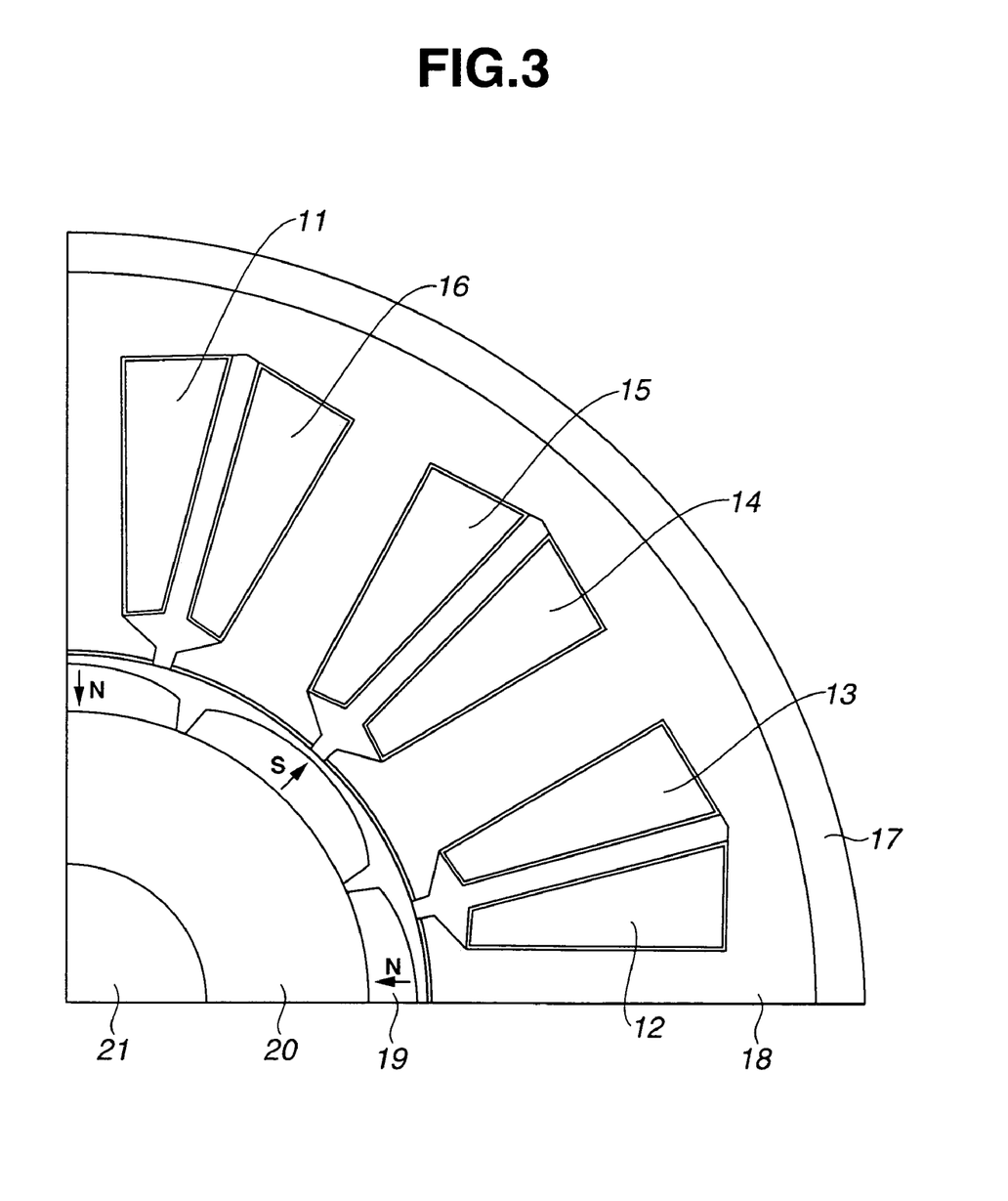
FIG. 3 is a fragmentary (¼) sectional view of a surface magnet type motor with concentrated windings, to which the rare earth magnet according to the present invention is applied.

The invention relates to, as the third aspect, a motor containing a rare earth magnet according to the first aspect of the invention. FIG. 3 for reference is a ¼ cross sectional view showing a surface magnet motor with concentrated windings (or coils) with a high electric resistance rare earth magnet according to the invention applied thereto. In the figure, the numeral 11 denote au-phase coil (or winding), 12 denotes au-phase coil, 13 denotes a v-phase coil, 14 denotes a v-phase coil, 15 denotes a w-phase coil, 16 denotes a w-phase coil, 17 denotes an aluminum casing, 18 denotes a stator, 19 denotes a magnet, 20 denotes an iron rotor, and 21 denotes an axis. The rare earth magnet of the invention has a high electric resistance and is excellent in magnet characteristics. Therefore, in the case where a motor produced by using the rare earth magnet of the invention is utilized, the continuous output power of the motor can be easily increased, and thus it is suitable for motors of moderate to high output power. The motor using the rare earth magnet of the invention can reduce the size and weight of the product using the motor owing to the excellent magnet characteristics. For example, in the case where the motor is applied to an automobile part, the fuel consumption can be suppressed owing to the reduction in weight of the automobile body. Furthermore, the motor is particularly effective as a driving motor of an electric vehicle (or automobile) and a hybrid drive vehicle (or automobile). Accordingly, a driving motor can be mounted on such a position that is difficult to provide a space for mounting a motor, and thus, it is considered that the motor fulfills a considerable role in popularization of an electric vehicle and a hybrid drive vehicle.

EXAMPLE

The invention will be described in more detail with reference to the following examples, but the invention is not construed as being limited to the examples.

<Example 1>

Nd—Fe—B anisotropic magnet powder prepared by using the known HDDR method was used as rare earth magnet powder. Specific procedures were as follows. An ingot having a composition of $Co_{17.4}B_{6.5}Ga_{0.3}Al_{0.5}Zr_{0.1}Fe_{balance}$ (12.6% of Nd, 17.4% of Co, 6.5% of B, 0.3% of Ga, 0.5% of Al, 0.1% of Zr and the balance of Fe) was prepared. The ingot was homogenized by maintaining at 1,120° C. for 20 hours. The ingot thus homogenized was increased in temperature from room temperature to 500° C. in a hydrogen atmosphere and maintained at that temperature, and then it was increased in temperature to 850° C. and maintained at that temperature. Subsequently, the ingot was maintained at 850° C. in a vacuum atmosphere and then cooled to obtain an alloy having a recombination aggregation structure (crystal grains) of a fine ferromagnetic phase. The alloy was powdered in an argon gas by using a jaw crusher and a Braun mill to obtain rare earth magnet powder having an average particle size of 300 µm or less.

$Tb_4O_7$ powder and $Dy_2O_3$ powder were mixed and subjected to a heat treatment at 1,650° C. in the air for 12 hours, and the mixture was subjected to a heat treatment at 900° C. in a hydrogen atmosphere for 4 hours to obtain $Tb_{1.0}Dy_{1.0}O_3$ powder, which was used as rare earth oxide powder. The rare earth oxide powder was prepared to have an average particle size of about 0.6 µm with a ball mill.

A mixture of the rare earth magnet powder and the rare earth oxide powder was prepared. The addition amount of the $Tb_{1.0}Dy_{1.0}O_3$ powder was 8% by mass based on the total mass of the mixture.

A forming die is charged with the mixture, and the mixture is provisionally formed while the orientation of the rare earth magnet powder was made by applying a magnetic field to the mixture in the forming die. The magnetic field applied for orientation was 1.6 MA/m, and the forming pressure was $2 \times 10^2$ MPa.

The mixture thus provisionally formed was formed by pressure sintering in vacuum to obtain a balk rare earth magnet. An electro-discharge plasma sintering apparatus was used for this forming. The sintering temperature was 800° C., the retention time was 3 minutes, and the forming pressure was $2 \times 10^2$ MPa. The rare earth magnet thus obtained was measured for density, coercive force, maximum energy product and electric resistance. The density of the magnet was obtained from the dimension and the mass of the rare earth magnet. The magnet characteristics (coercive force and maximum energy product) were measured in such a manner that a test piece was previously magnetized at a magnetization magnetic field of 10 T by using a pulse excitation magnetizing apparatus, MPM-15, produced by Toei Industry Co., Ltd., and then measured with a BH measuring apparatus, TRF-5AH-25 Auto, produced by Toei Industry Co., Ltd. The electric resistivity was measured by a four-point probe method using a resistivity probe apparatus which includes a Fell Prove Head having a product number of 31311-0016-1MM-200, produced by Micro-Swiss LTD. The styluses of the probe were formed of tungsten carbide and had a tip end radius of 40 µm and a stylus distance of 1 mm, and the total load on the four styluses was about 400 g. The evaluation of the rare earth magnets obtained in the following examples and comparative examples were made in the same manner. The rare earth magnet thus obtained had a density of $7.6 \times 10^3$ kg/m$^3$, a coercive force of 1.03 MA/m, a maximum energy product of 0.23 MJ/m$^3$, and an electric resistivity of 36.0 µΩm. The results are summarized in Table 1 below.

It was demonstrated that the rare earth magnet thus obtained was an anisotropic Nd—Fe—B rare earth magnet excellent in both maximum energy product and electric resistivity.

<Example 2>

A bulk rare earth magnet was obtained in the same manner as in Example 1 except that $Dy_{1.6}Ho_{0.4}O_3$ powder having an average particle size of about 0.9 µm produced by mixing $Dy_2O_3$ powder and $Ho_2O_3$ powder and subjected to a heat treatment at 1,650° C. in the air for 12 hours was used as rare earth oxide powder, and the addition amount of the $Dy_{1.6}Ho_{0.4}O_3$ powder was 4% by mass based on the total mass of the mixture. The rare earth magnet thus obtained was measured for density, coercive force, maximum energy product and electric resistance. The rare earth magnet thus obtained had a density of $7.6 \times 10^3$ kg/m$^3$, a coercive force of 0.96 MA/m, a maximum energy product of 0.23 MJ/m$^3$, and an electric resistivity of 28.0 µΩm. The results are summarized in Table 1 below.

It was demonstrated that the rare earth magnet thus obtained was an anisotropic Nd—Fe—B rare earth magnet excellent in both maximum energy product and electric resistivity.

<Example 3>

Nd—Fe—B anisotropic magnet powder prepared by using the known UPSET method was used as rare earth magnet powder. Specific procedures were as follows. An ingot having a composition of $Nd_{13.7}Co_{6.7}B_{5.5}Ga_{0.6}Fe_{balance}$ (13.7% of Nd, 6.7% of Co, 5.5% of B, 0.6% of Ga and the balance of F) was prepared. The ingot was melted at a high frequency, and the resulting molten liquid was sprayed on a single roll rotating at a peripheral velocity of 30 m/s to obtain a quenched Nd—Fe—B based thin strip. The strip was pulverized in a mortar to an average diameter of 350 µm or less. A mild steel-made cylindrical vessel was charged with the quenched thin strip, and after vacuating the interior of the vessel, the cylindrical vessel was sealed. The vessel was subjected to high frequency induction heating to 800° C., and was uniaxially compressed by using a pressing machine. Subsequently, a Nd—Fe—B based magnet material was taken out from the vessel and formed into rare earth magnet powder having an average particle size of 300 µm or less by using a coffee mill.

$Ho_2O_3$ powder and $Er_2O_3$ powder were mixed and subjected to a heat treatment at 1,650° C. in the atmospheric air for 12 hours to obtain $Ho_{1.0}Er_{1.0}O_3$ powder, which was used as rare earth oxide powder. The rare earth oxide powder was prepared to have an average particle size of about 0.7 µm with a ball mill.

A mixture of the rare earth magnet powder and the rare earth oxide powder was prepared. The addition amount of the $Ho_{1.0}Er_{1.0}O_3$ powder was 10% by mass based on the total mass of the mixture.

A forming die was charged with the mixture, and the mixture was provisionally formed while the orientation of the rare earth magnet powder was made by applying a magnetic field to the mixture in the forming die. The magnetic field applied for orientation was 1.6 MA/m, and the forming pressure was $2 \times 10^2$ MPa.

The mixture thus provisionally formed was formed by pressure sintering in vacuum to obtain a balk rare earth magnet. A hot press machine was used for this forming. The sintering temperature was 800° C., the retention time was 40 minutes, and the forming pressure was $2 \times 10^2$ MPa. The rare earth magnet thus obtained was measured for density, coercive force, maximum energy product and electric resistance. The rare earth magnet thus obtained had a density of $7.6 \times 10^3$ kg/m$^3$, a coercive force of 0.94 MA/m, a maximum energy product of 0.20 MJ/m$^3$, and an electric resistivity of 33.0 µΩm. The results are summarized in Table 1 below.

It was demonstrated that the rare earth magnet thus obtained was an anisotropic Nd—Fe—B rare earth magnet excellent in both maximum energy product and electric resistivity.

<Example 4>

A bulk rare earth magnet was obtained in the same manner as in Example 1 except that $Yb_{0.2}Lu_{1.8}O_3$ powder having an average particle size of about 0.9 μm produced by mixing $Yb_2O_3$ powder and $Lu_2O_3$ powder and subjected to a heat treatment at 1,650° C. in the atmospheric air for 12 hours was used as rare earth oxide powder, and the addition amount of the $Yb_{0.2}Lu_{1.8}O_3$ powder was 7% by mass based on the total mass of the mixture. The rare earth magnet thus obtained was measured for density, coercive force, maximum energy product and electric resistance. The rare earth magnet thus obtained had a density of $7.6×10^3$ kg/m$^3$, a coercive force of 0. 92 MA/m, a maximum energy product of 0.20MJ/m$^3$, and an electric resistivity of 29.5 μΩM. The results are summarized in Table 1 below.

It was demonstrated that rare earth magnet thus obtained was an anisotropic Nd—Fe—B rare earth magnet excellent in both maximum energy product and electric resistivity.

<Comparative Example 1>

A bulk rare earth magnet was obtained in the same manner as in Example 1 except that the $Tb_{1.0}Dy_{1.0}O_3$ powder as the rare earth oxide powder was not added. The rare earth magnet thus obtained was measured for density, coercive force, maximum energy product and electric resistance. The rare earth magnet thus obtained had a density of $7.6×10^3$ kg/m$^3$, a coercive force of 0.97 MA/m, a maximum energy product of 0.26 MJ/m$^3$, and an electric resistivity of 1.4 μΩM. The results are summarized in Table 1 below.

It was demonstrated that the rare earth magnet thus obtained was excellent in maximum energy product; however, it was such an anisotropic Nd—Fe—B rare earth magnet that was considerably inferior in electric resistivity because the rare earth oxide defined in the invention was not added.

<Comparative Example 2>

A bulk rare earth magnet was obtained in the same manner as in Example 1 except that $HfO_2$ powder having an average particle size of about 2 μm was used as rare earth oxide, and the addition amount of the $HfO_2$ powder was 10% by mass based on the total mass of the mixture. The rare earth magnet thus obtained was measured for density, coercive force, maximum energy product and electric resistance. The rare earth magnet thus obtained had a density of $7.8×10^3$kg/m$^3$, a coercive force of 0.09 MA/m, a maximum energy product of 0.02 MJ/m$^3$, and an electric resistivity of 2.4 μΩm.

The results are summarized in Table 1 below.

It was demonstrated that the rare earth magnet thus obtained was inferior in both maximum energy product and electric resistivity. It is expected that this is because oxygen in $HfO_2$ added as an electrically insulating oxide was deprived by Nd in the rare earth magnet powder upon forming by pressure sintering.

TABLE 1

| | Kinds of rare earth magnet powder | Rare earth oxide | x | Addition amount of rare earth oxide (% by mass) | Density of magnet (kg/m$^3$) | Coercive force (MA/m) | Maximum energy product (MJ/m$^3$) | Electric resistivity (μΩm) |
|---|---|---|---|---|---|---|---|---|
| Example 1 | HDDR | $Tb_{2x}Dy_{2(1-x)}O_3$ | 0.5 | 8.0 | 7.6 × 10$^3$ | 1.03 | 0.23 | 36.0 |
| Example 2 | HDDR | $Dy_{2x}Ho_{2(1-x)}O_3$ | 0.8 | 4.0 | 7.6 × 10$^3$ | 0.96 | 0.23 | 28.0 |
| Example 3 | UPSET | $Ho_{2x}Er_{2(1-x)}O_3$ | 0.5 | 10.0 | 7.6 × 10$^3$ | 0.94 | 0.20 | 33.0 |
| Example 4 | HDDR | $Yb_{2x}Lu_{2(1-x)}O_3$ | 0.1 | 7.0 | 7.6 × 10$^3$ | 0.92 | 0.20 | 29.5 |
| Comparative Example 1 | HDDR | none | — | 0.0 | 7.6 × 10$^3$ | 0.97 | 0.26 | 1.4 |
| Comparative Example 2 | HDDR | $HfO_2$ | — | 10.0 | 7.8 × 10$^3$ | 0.09 | 0.02 | 2.4 |

<Example 5>

The rare earth magnet obtained in Example 1 was applied to a surface magnet type permanent magnet motor (stator: 12 poles, rotor: 8 poles). FIG. 3 is a ¼ cross sectional view showing the surface magnet type motor with concentrated windings (or coils) thus prepared. The motor included an aluminum casing 17 located outside a stator 18 which is provided with u-phase coils 11 and 12, v-phase coils 13 and 14, and w-phase coils 15 and 16. The stator 18 was a laminated body of electromagnetic steel plates. Magnets (the rare earth magnets obtained in Example 1) 19 of the shape shown in the figure was disposed on an iron rotor 20. The numeral 21 denotes an axis. The output of the motor produced by using the rare earth magnet of Example 1 exhibited a continuous output power of 1.8 kW.

<Comparative Example 3>

A motor was produced in the same manner as in Example 5 except that the rare earth magnet obtained in Comparative Example 1 was used as the magnets 19. The motor thus produced exhibited a continuous output power of 1.2 kW.

<Example 6>

Nd—Fe—B anisotropic magnet powder prepared by using the known HDDR method was used as rare earth magnet powder. Specific procedures were as follows. An ingot having a composition of $Nd_{12.6}Co_{17.4}B_{6.5}Ga_{0.3}Al_{0.5}Zr_{0.1}Fe_{balance}$ (12.6% of Nd, 17.4% of Co 6.5% of B, 0.3% of Ga, 0.5% of Al, 0.1% of Zr and the balance of Fe) was prepared. The ingot was homogenized by maintaining at 1,120° C. for 20 hours. The ingot thus homogenized was increased in temperature from room temperature to 500° C. in a hydrogen atmosphere and maintained at that temperature, and then it was increased in temperature to 850° C. and maintained at that temperature.

Subsequently, the ingot was maintained at 850° C. in a vacuum atmosphere and then cooled to obtain an alloy having a recombination aggregation structure (crystal grains) of a fine ferromagnetic phase. The alloy was powdered in an argon gas by using a jaw crusher and a Braun mill to obtain rare earth magnet powder having an average particle size of 300 μm or less.

$Y_2O_3$ powder and $Tb_4O_7$ powder were mixed and subjected to a heat treatment at 1,650° C. in the air for 12 hours, and the mixture was subjected to a heat treatment at 900° C. in a hydrogen atmosphere for 4 hours to obtain $Y_{1.6}Tb_{0.4}O_3$ powder, which was used as rare earth oxide powder. The rare earth oxide powder was prepared to have an average particle size of about 1.2 μm with a ball mill.

A mixture of the rare earth magnet powder and the rare earth oxide powder was prepared. The addition amount of the $Y_{1.6}Tb_{0.4}O_3$ powder was 6% by mass based on the total mass of the mixture.

A forming die was charged with the mixture, and the mixture was provisionally formed while the orientation of the rare earth magnet powder was made by applying a magnetic field to the mixture in the forming die. The magnetic field applied for orientation was 1.6 MA/m, and the forming pressure was $2 \times 10^2$ MPa.

The mixture thus provisionally formed was formed by pressure sintering in vacuum to obtain a balk rare earth magnet. An electro-discharge plasma sintering apparatus was used for this forming. The sintering temperature was 750° C., the retention time was 3 minutes, and the forming pressure was $3 \times 10^2$ MPa. The rare earth magnet thus obtained was measured for density, coercive force, maximum energy product and electric resistance. The rare earth magnet thus obtained had a density of $7.6 \times 10^3$ kg/m³, a coercive force of 0.94 MA/m, a maximum energy product of 0.20 MJ/m³, and an electric resistivity of 35.5 μΩm. The results are summarized in Table 2 below.

It was demonstrated that the rare earth magnet thus obtained was an anisotropic Nd—Fe—B rare earth magnet excellent in both maximum energy product and electric resistivity.

<Example 7>

Nd—Fe—B anisotropic magnet powder prepared by using the known UPSET method was used as rare earth magnet powder. Specific procedures were as follows. An ingot having a composition of $Nd_{13.7}Co_{6.7}B_{5.5}Ga_{0.6}Fe_{balance}$ (13.7% of Nd, 6.7% of Co, 5.5% of B, 0.6% of Ga and the balance of F) was prepared. The ingot was melted at a high frequency, and the resulting molten liquid was sprayed on a single roll rotating at a peripheral velocity of 30 m/s to obtain a quenched Nd—Fe—B based thin strip. The strip was pulverized in a mortar to an average diameter of 350 μm or less. A mild steel-made cylindrical vessel was charged with the quenched thin strip, and after vacuating the interior of the vessel, the cylindrical vessel was sealed. The vessel was subjected to high frequency induction heating to 800° C., and was uniaxially compressed by using a pressing machine. Subsequently, a Nd—Fe—B based magnet material was taken out from the vessel and formed into rare earth magnet powder having an average particle size of 300 μm or less by using a coffee mill.

$Y_2O_3$ powder and $Tb_4O_7$ powder were mixed and subjected to a heat treatment at 1,650° C. in the atmospheric air for 12 hours, followed by being further subjected to a heat treatment at 900° C. in the hydrogen atmosphere for 4 hours to obtain $Y_{0.4}Tb_{1.6}O_3$ powder, which was used as rare earth oxide powder. The rare earth oxide powder was prepared to have an average particle size of about 0.9 μm with a ball mill.

A mixture of the rare earth magnet powder and the rare earth oxide powder was prepared. The addition amount of the $Y_{0.4}Tb_{1.6}O_3$ powder was 7% by mass based on the total mass of the mixture.

A forming die was charged with the mixture, and the mixture was provisionally formed while the orientation of the rare earth magnet powder was made by applying a magnetic field to the mixture in the forming die. The magnetic field applied for orientation was 1.6 MA/m, and the forming pressure was $2 \times 10^2$ MPa.

The mixture thus provisionally formed was formed by pressure sintering in vacuum to obtain a balk rare earth magnet. An electro-discharge plasma sintering apparatus was used for this forming. The sintering temperature was 800° C., the retention time was 3 minutes, and the forming pressure was $2 \times 10^2$ MPa. The rare earth magnet thus obtained was measured for density, coercive force, maximum energy product and electric resistance. The rare earth magnet thus obtained had a density of $7.6 \times 10^3$ kg/m³, a coercive force of 0.97 MA/m, a maximum energy product of 0.19 MJ/m3, and an electric resistivity of 33.0 μΩm. The results are summarized in Table 2 below.

It was demonstrated that the rare earth magnet thus obtained was an anisotropic Nd—Fe—B rare earth magnet excellent in both maximum energy product and electric resistivity.

<Example 8>

A bulk rare earth magnet was obtained in the same manner as in Example 6 except that $Y_{0.2}Dy_{1.8}O_3$ powder having an average particle size of about 1.1 μm produced by mixing $Y_2O_3$ powder and $Dy_2O_3$ powder and subjected to a heat treatment at 1,650° C. in the atmospheric air for 12 hours was used as rare earth oxide powder, and the addition amount of the $Y_{0.2}Dy_{1.8}O_3$ powder was 7% by mass based on the total mass of the mixture. The rare earth magnet thus obtained was measured for density, coercive force, maximum energy product and electric resistance. The rare earth magnet thus obtained had a density of $7.6 \times 10^3$ kg/m³, a coercive force of 0. 96 MA/m, a maximum energy product of 0. 21MJ/m³, and an electric resistivity of 31.5 μΩm. The results are summarized in Table 2 below.

It was demonstrated that rare earth magnet thus obtained was an anisotropic Nd—Fe—B rare earth magnet excellent in both maximum energy product and electric resistivity.

<Example 9>

A bulk rare earth magnet was obtained in the same manner as in Example 6 except that $Y_{1.0}Dy_{1.0}O_3$ powder having an average particle size of about 1.3 μm produced by mixing $Y_2O_3$ powder and $Dy_2O_3$ powder and subjected to a heat treatment at 1,650° C. in the atmospheric air for 12 hours was used as rare earth oxide powder, and the addition amount of the $Y_{1.0}Dy_{1.0}O_3$ powder was 4% by mass based on the total mass of the mixture, and additionally the electro-discharge plasma sintering apparatus was operated at a sintering temperature of 800° C., a retention time of 3 minutes, and a forming pressure of $2 \times 10^2$ MPa. The rare earth magnet thus obtained was measured for density, coercive force, maximum energy product and electric resistance. The rare earth magnet thus obtained had a density of $7.6 \times 10^3$ kg/m³, a coercive force of 0.95 MA/m, a maximum energy product of 0.21 MJ/m$^3$, and an electric resistivity of 30.5 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 10>

A bulk rare earth magnet was obtained in the same manner as in Example 6 except that Y$_{1.6}$Dy$_{0.4}$O$_3$ powder having an average particle size of about 0.8 $\mu$m produced by mixing Y$_2$O$_3$ powder and Dy$_2$O$_3$ powder and subjected to a heat treatment at 1,650° C. in the atmospheric air for 12 hours was used as rare earth oxide powder, and the addition amount of the Y$_{1.6}$Dy$_{0.4}$O$_3$ powder was 3% by mass based on the total mass of the mixture. The rare earth magnet thus obtained was measured for density, coercive force, maximum energy product and electric resistance. The rare earth magnet thus obtained had a density of 7.6×10$^3$ kg/m$^3$, a coercive force of 0. 93 MA/m, a maximum energy product of 0.19 MJ/m$^3$, and an electric resistivity of 28.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 11>

A bulk rare earth magnet was obtained in the same manner as in Example 6 except that Y$_{1.8}$Lu$_{0.2}$O$_3$ powder having an average particle size of about 1.0 $\mu$m produced by mixing Y$_2$O$_3$ powder and Lu$_2$O$_3$ powder and subjected to a heat treatment at 1,650° C. in the atmospheric air for 12 hours was used as rare earth oxide powder, and the addition amount of the Y$_{1.8}$Lu$_{0.2}$O$_3$ powder was 4% by mass based on the total mass of the mixture. The rare earth magnet thus obtained was measured for density, coercive force, maximum energy product and electric resistance. The rare earth magnet thus obtained had a density of 7.6×10$^3$ kg/m$^3$, a coercive force of 0.88MA/m, a maximum energy product of 0.20 MJ/m$^3$, and an electric resistivity of 28.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 12>

A bulk rare earth magnet was obtained in the same manner as in Example 6 except that Tb$_{1.0}$Dy$_{1.0}$O$_3$ powder having an average particle size of about 1.0 $\mu$m produced by mixing Tb$_4$O$_7$ powder and Dy$_2$O$_3$ powder and subjected to a heat treatment at 1,650° C. in the atmospheric air for 12 hours, followed by being further subjected to a heat treatment at 900° C. in the hydrogen atmosphere for 4 hours was used as rare earth oxide powder, and the addition amount of the Tb$_{1.0}$Dy$_{1.0}$O$_3$ powder was 8% by mass based on the total mass of the mixture. The rare earth magnet thus obtained was measured for density, coercive force, maximum energy product and electric resistance. The rare earth magnet thus obtained had a density of 7.6×10$^3$kg/m$^3$, a coercive force of 1.03 MA/m, a maximum energy product of 0.23 MJ/m$^3$, and an electric resistivity of 36.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 13>

A bulk rare earth magnet was obtained in the same manner as in Example 6 except that Tb$_{1.8}$Dy$_{0.2}$O$_3$ powder having an average particle size of about 1.4 $\mu$m produced by mixing Tb$_4$O$_7$ powder and Dy$_2$O$_3$ powder and subjected to a heat treatment at 1,650° C. in the atmospheric air for 12 hours, followed by being further subjected to a heat treatment at 900° C. in the hydrogen atmosphere for 4 hours was used as rare earth oxide powder, and the addition amount of the Tb$_{1.8}$Dy$_{0.2}$O$_3$ powder was 6% by mass based on the total mass of the mixture. The rare earth magnet thus obtained was measured for density, coercive force, maximum energy product and electric resistance. The rare earth magnet thus obtained had a density of 7.6×10$^3$ kg/m$^3$, a coercive force of 1.00 MA/m, a maximum energy product of 0.22 MJ/m$^3$, and an electric resistivity of 33.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 14>

A bulk rare earth magnet was obtained in the same manner as in Example 9 except that Dy$_{1.6}$Ho$_{0.4}$O$_3$ powder having an average particle size of about 0.9 $\mu$m produced by mixing Dy$_2$O$_3$ powder and Ho$_2$O$_3$ powder and subjected to a heat treatment at 1,650° C. in the atmospheric air for 12 hours was used as rare earth oxide powder, and the addition amount of the Dy$_{1.6}$Ho$_{0.4}$O$_3$ powder was 4% by mass based on the total mass of the mixture. The rare earth magnet thus obtained was measured for density, coercive force, maximum energy product and electric resistance. The rare earth magnet thus obtained had a density of 7.6×10$^3$ kg/m$^3$, a coercive force of 0.96 MA/m, a maximum energy product of 0.23 MJ/m$^3$, and an electric resistivity of 28.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 15>

Nd—Fe—B anisotropic magnet powder prepared by using the known UPSET method as same as in Example 7 was used as rare earth magnet powder.

Ho$_2$O$_3$ powder and Er$_2$O$_3$ powder were mixed and subjected to a heat treatment at 1,650° C. in the atmospheric air for 12 hours to obtain Ho$_{1.0}$Er$_{1.0}$O$_3$ powder which had an average particle size of about 0.7 $\mu$m and used as rare earth oxide powder. A mixture of the rare earth magnet powder and the rare earth oxide powder was prepared. The addition amount of the Ho$_{1.0}$Er$_{1.0}$O$_3$ powder was 10% by mass based on the total mass of the mixture.

A forming die was charged with the mixture, and the mixture was provisionally formed while the orientation of the rare earth magnet powder was made by applying a magnetic field to the mixture in the forming die. The magnetic field applied for orientation was 1.6 MA/m, and the forming pressure was 2×10$^2$MPa. The mixture thus provisionally formed was formed by pressure sintering in vacuum to obtain a balk rare earth magnet. A hot press machine was used for this forming. The sintering temperature was 800° C., the retention time was 40 minutes, and the forming pressure was 2×10$^2$ MPa. The rare earth magnet thus obtained was measured for density, coercive force, maximum energy product and electric resistance. The rare earth magnet thus obtained had a density of $7.5 \times 10^3$ kg/m³, a coercive force of 0.94 MA/m, a maximum energy product of 0.20 MJ/m³, and an electric resistivity of 33.0 $\mu\Omega$m. The results are summarized in Table 1 below.

It was demonstrated that the rare earth magnet thus obtained was an anisotropic Nd—Fe—B rare earth magnet excellent in both maximum energy product and electric resistivity.

<Example 16>

A bulk rare earth magnet was obtained in the same manner as in Example 9 except that $Yb_{0.2}Lu_{1.8}O_3$ powder having an average particle size of about 0.9 $\mu$m produced by mixing $Yb_2O_3$ powder and $Lu_2O_3$ powder and subjected to a heat treatment at 1,650° C. in the atmospheric air for 12 hours was used as rare earth oxide powder, and the addition amount of the $Yb_{0.2}Lu_{1.8}O_3$ powder was 7% by mass based on the total mass of the mixture. The rare earth magnet thus obtained was measured for density, coercive force, maximum energy product and electric resistance. The rare earth magnet thus obtained had a density of $7.7 \times 10^3$ kg/m³, a coercive force of 0.92 MA/m, a maximum energy product of 0.20MJ/m³, and an electric resistivity of 29.5 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 17>

A bulk rare earth magnet was obtained in the same manner as in Example 6 except that $Nd_{1.6}Dy_{0.4}O_3$ powder having an average particle size of about 1.3 $\mu$m produced by mixing $Nd_2O_3$ powder and $Dy_2O_3$ powder and subjected to a heat treatment at 1,650° C. in the atmospheric air for 12 hours was used as rare earth oxide powder, and the addition amount of the $Nd_{1.6}Dy_{0.4}O_3$ powder was 8% by mass based on the total mass of the mixture. The rare earth magnet thus obtained was measured for density, coercive force, maximum energy product and electric resistance. The rare earth magnet thus obtained had a density of $7.6 \times 10^3$ kg/m³, a coercive force of 0.88 MA/m, a maximum energy product of 0.20 MJ/m³, and an electric resistivity of 30.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 18>

A bulk rare earth magnet was obtained in the same manner as in Example 6 except that $Nd_{1.0}Dy_{1.0}O_3$ powder having an average particle size of about 1.8 $\mu$m produced by mixing $Nd_2O_3$ powder and $Dy_2O_3$ powder and subjected to a heat treatment at 1,650° C. in the atmospheric air for 12 hours was used as rare earth oxide powder, and the addition amount of the $Nd_{1.0}Dy_{1.0}O_3$ powder was 8% by mass based on the total mass of the mixture. The rare earth magnet thus obtained was measured for density, coercive force, maximum energy product and electric resistance. The rare earth magnet thus obtained had a density of $7.6 \times 10^3$ kg/m³, a coercive force of 0.95 MA/m, a maximum energy product of 0.20 MJ/m³, and an electric resistivity of 32.5 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

<Example 19>

A bulk rare earth magnet was obtained in the same manner as in Example 6 except that $Nd_{0.2}Dy_{1.8}O_3$ powder having an average particle size of about 1.2 $\mu$m produced by mixing $Nd_2O_3$ powder and $Dy_2O_3$ powder and subjected to a heat treatment at 1,650° C. in the atmospheric air for 12 hours was used as rare earth oxide powder, and the addition amount of the $Nd_{0.2}Dy_{1.8}O_3$ powder was 6% by mass based on the total mass of the mixture. The rare earth magnet thus obtained was measured for density, coercive force, maximum energy product and electric resistance. The rare earth magnet thus obtained had a density of $7.6 \times 10^3$ kg/m³, a coercive force of 0.91 MA/m, a maximum energy product of 0.20MJ/m³, and an electric resistivity of 31.0 $\mu\Omega$m. The results are summarized in Table 2 below.

It was demonstrated that rare earth magnet thus obtained was an anisotropic Nd—Fe—B rare earth magnet excellent in both maximum energy product and electric resistivity.

TABLE 2

| | Kinds of rare earth magnet powder | Rare earth oxide | x | Addition amount of rare earth oxide (% by mass) | Density of magnet (kg/m³) | Coercive force (MA/m) | Maximum energy product (MJ/m³) | Electric resistivity ($\mu\Omega$m) |
|---|---|---|---|---|---|---|---|---|
| Example 6 | HDDR | $Y_{2x}Tb_{2(1-x)}O_3$ | 0.8 | 6.0 | $7.6 \times 10^3$ | 0.94 | 0.20 | 35.5 |
| Example 7 | UPSET | $Y_{2x}Tb_{2(1-x)}O_3$ | 0.2 | 7.0 | $7.6 \times 10^3$ | 0.97 | 0.19 | 33.0 |
| Example 8 | HDDR | $Y_{2x}Dy_{2(1-x)}O_3$ | 0.1 | 7.0 | $7.6 \times 10^3$ | 0.96 | 0.21 | 31.5 |
| Example 9 | HDDR | $Y_{2x}Dy_{2(1-x)}O_3$ | 0.5 | 4.0 | $7.6 \times 10^3$ | 0.95 | 0.21 | 30.5 |
| Example 10 | UPSET | $Y_{2x}Dy_{2(1-x)}O_3$ | 0.8 | 3.0 | $7.6 \times 10^3$ | 0.93 | 0.19 | 28.0 |
| Example 11 | HDDR | $Y_{2x}Lu_{2(1-x)}O_3$ | 0.9 | 4.0 | $7.6 \times 10^3$ | 0.88 | 0.20 | 28.0 |
| Example 12 | HDDR | $Tb_{2x}Dy_{2(1-x)}O_3$ | 0.5 | 8.0 | $7.6 \times 10^3$ | 1.03 | 0.23 | 36.0 |
| Example 13 | HDDR | $Tb_{2x}Dy_{2(1-x)}O_3$ | 0.9 | 6.0 | $7.6 \times 10^3$ | 1.00 | 0.22 | 33.0 |
| Example 14 | HDDR | $Dy_{2x}Ho_{2(1-x)}O_3$ | 0.8 | 4.0 | $7.6 \times 10^3$ | 0.96 | 0.23 | 28.0 |
| Example 15 | UPSET | $Ho_{2x}Er_{2(1-x)}O_3$ | 0.5 | 10.0 | $7.5 \times 10^3$ | 0.94 | 0.20 | 33.0 |
| Example 16 | HDDR | $Yb_{2x}Lu_{2(1-x)}O_3$ | 0.1 | 7.0 | $7.7 \times 10^3$ | 0.92 | 0.20 | 29.5 |
| Example 17 | HDDR | $Nd_{2x}Dy_{2(1-x)}O_3$ | 0.8 | 5.0 | $7.6 \times 10^3$ | 0.88 | 0.20 | 30.0 |
| Example 18 | HDDR | $Nd_{2x}Dy_{2(1-x)}O_3$ | 0.5 | 8.0 | $7.6 \times 10^3$ | 0.95 | 0.20 | 32.5 |
| Example 19 | HDDR | $Nd_{2x}Dy_{2(1-x)}O_3$ | 0.1 | 6.0 | $7.6 \times 10^3$ | 0.91 | 0.20 | 31.0 |

<Example 20>

A motor was produced in the same manner as in Example 5 except that the rare earth magnet obtained in Example 12 was used as the magnets 19. The motor thus produced exhibited a continuous output power of 1.8 kW.

It will understood from the above that the rare earth magnet of the invention has a high electric resistance and a low eddy current loss to provide less heat generation from the magnet, and therefore, it is advantageous in thermal design. Furthermore, it has excellent magnet characteristics. Accordingly, it has been found that continuous output power of a motor can be easily improved.

As appreciated from the above, the rare earth magnet of the invention has such a structure that a rare earth oxide is present among rare earth magnet particles, so that the rare earth magnet particles are bound with the rare earth oxide. Accordingly, The rare earth magnet thus obtained has a considerably high electric resistance. Furthermore, the rare earth oxide specified in the invention has poor reactivity with a rare earth element. Accordingly, the rare earth magnet thus obtained has considerably excellent magnet characteristics even in the case where severe production conditions are employed, such as pressure sintering.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A rare earth magnet comprising:
   rare earth magnet particles; and
   a rare earth oxide which is present among the rare earth magnet particles, the rare earth oxide being represented by the following general formula (I):

$$R_{2x}R'_{2(1-x)}O_3 \quad (I)$$

where each of R and R' is one element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$,
   wherein R and R' refer to different elements and
   wherein the rare earth magnet particles and the rare earth oxide are physically or chemically bound together.

2. A rare earth magnet as claimed in claim 1, where each of R and R' is one element selected from the group consisting of yttrium (Y), terbium (Tb), dysprosium (Dy), holmium (Ho), erbium (Er), thulium (Tm), ytterbium (Yb) and lutetium (Lu).

3. A rare earth magnet as claimed in claim 1, wherein R is neodymium (Nd), and R' is one element selected from the group consisting of terbium (Tb), dysprosium (Dy), holmium (Ho), erbium (Er), thulium (Tm), ytterbium (Yb) and lutetium (Lu).

4. A rare earth magnet as claimed in claim 3, wherein R' is terbium (Tb), and $0<x<0.83$.

5. A rare earth magnet as claimed in claim 3, wherein R' is dysprosium (Dy), and $0<x<0.86$.

6. A rare earth magnet as claimed in claim 3, wherein R' is holmium (Ho), and $0<x<0.86$.

7. A rare earth magnet as claimed in claim 3, wherein R' is erbium (Er), and $0<x<0.88$.

8. A rare earth magnet as claimed in claim 3, wherein R' is thulium (Tm), and $0<x<0.89$.

9. A rare earth magnet as claimed in claim 3, wherein R' is ytterbium (Yb), and $0<x<0.90$.

10. A rare earth magnet as claimed in claim 3, wherein R' is lutetium (Lu), and $0<x<0.91$.

11. A rare earth magnet as claimed in claim 1, wherein the rare earth magnet particles have a particle size ranging from 1 to 500 μm.

12. A rare earth magnet as claimed in claim 1, wherein the rare earth magnet is a Nd—Fe—B based magnet.

13. A rare earth magnet as claimed in claim 1, wherein the rare earth magnet is an anisotropic magnet.

14. A process for producing a rare earth magnet, comprising:
    preparing a mixture containing rare earth magnet powder and rare earth oxide powder whose rare earth oxide is represented by the following general formula (I):

$$R_{2x}R'_{2(1-x)}O_3 \quad (I)$$

where each of R and R' is an element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$;
    charging a forming die with the mixture; and
    forming the mixture;
    wherein R and R' refer to different elements and
    wherein the step of forming the mixture comprises physically or chemically bonding together the rare earth magnet powder and the rare earth oxide powder.

15. A process as claimed in claim 14, wherein the rare earth magnet powder is anisotropic rare earth magnet powder, wherein the process further comprises provisionally forming the mixture while carrying out orientation of the rare earth magnet powder in a magnetic field, after the charging the forming die with the mixture and before the forming the mixture.

16. A process as claimed in claim 14, wherein the forming the mixture is carried out by using a pressure sintering.

17. A motor comprising:
    a rare earth magnet including
    rare earth magnet particles; and
    a rare earth oxide which is present among the rare earth magnet particles, the rare earth oxide being represented by the following general formula (I):

$$R_{2x}R'_{2(1-x)}O_3 \quad (I)$$

where each of R and R' is one element selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu), and $0<x<1$,
    wherein R and R' refer to different elements; and
    wherein the rare earth magnet particles and the rare earth oxide are physically or chemically bound together.

* * * * *